United States Patent [19]

Stegmaier

[11] Patent Number: 4,872,732
[45] Date of Patent: Oct. 10, 1989

[54] HYDRAULIC VEHICLE BRAKE SYSTEM

[75] Inventor: Alwin Stegmaier, Schwieberdingen, Fed. Rep. of Germany

[73] Assignee: Robert Bosch GmbH, Stuttgart, Fed. Rep. of Germany

[21] Appl. No.: 254,765

[22] Filed: Oct. 7, 1988

[30] Foreign Application Priority Data

Dec. 21, 1987 [DE] Fed. Rep. of Germany ....... 3743346

[51] Int. Cl.$^4$ ................................................. B60T 8/62
[52] U.S. Cl. ................................... 303/110; 180/197; 303/114
[58] Field of Search ................ 180/197; 303/100, 103, 303/105, 106, 110, 111, 114, 116, 119

[56] References Cited

U.S. PATENT DOCUMENTS

| 4,575,160 | 3/1986 | Leiber | 303/110 |
| 4,589,706 | 5/1986 | Leiber | 303/114 |
| 4,662,687 | 5/1987 | Leiber | 303/114 X |
| 4,736,993 | 4/1988 | Reinartz et al. | 303/100 X |

FOREIGN PATENT DOCUMENTS 2168771 6/1986 United Kingdom .

Primary Examiner—Duane A. Reger
Attorney, Agent, or Firm—Edwin E. Greigg

[57] ABSTRACT

The proposed vehicle brake system has wheel brakes, a master brake cylinder, an auxiliary pressure source, and a brake booster supplied from it for actuating the master brake cylinder, as well as an apparatus capable of preventing the danger of skidding and limiting drive slip at driven wheels. To prevent the danger of skidding, valves disposed between the master brake cylinder and the wheel brakes are provided by means of which the wheel brakes can be disconnected from the master brake cylinder and connected to a pressure fluid supply container to reduce the brake pressure. For replacing the quantities of pressure fluid diverted into this pressure fluid supply container, the valves are connected to the brake booster. To enable limiting drive slip at driven wheels at little expense for additional valves, valves embodied as 2/2-way valves are connected between the wheel brakes of driven wheels and their associated valves also communicate with the auxiliary pressure source. In drive slip limitation, the valves are directed into a blocking position, so that brake pressure required for drive slip limitation cannot escape into the master brake cylinder.

4 Claims, 4 Drawing Sheets

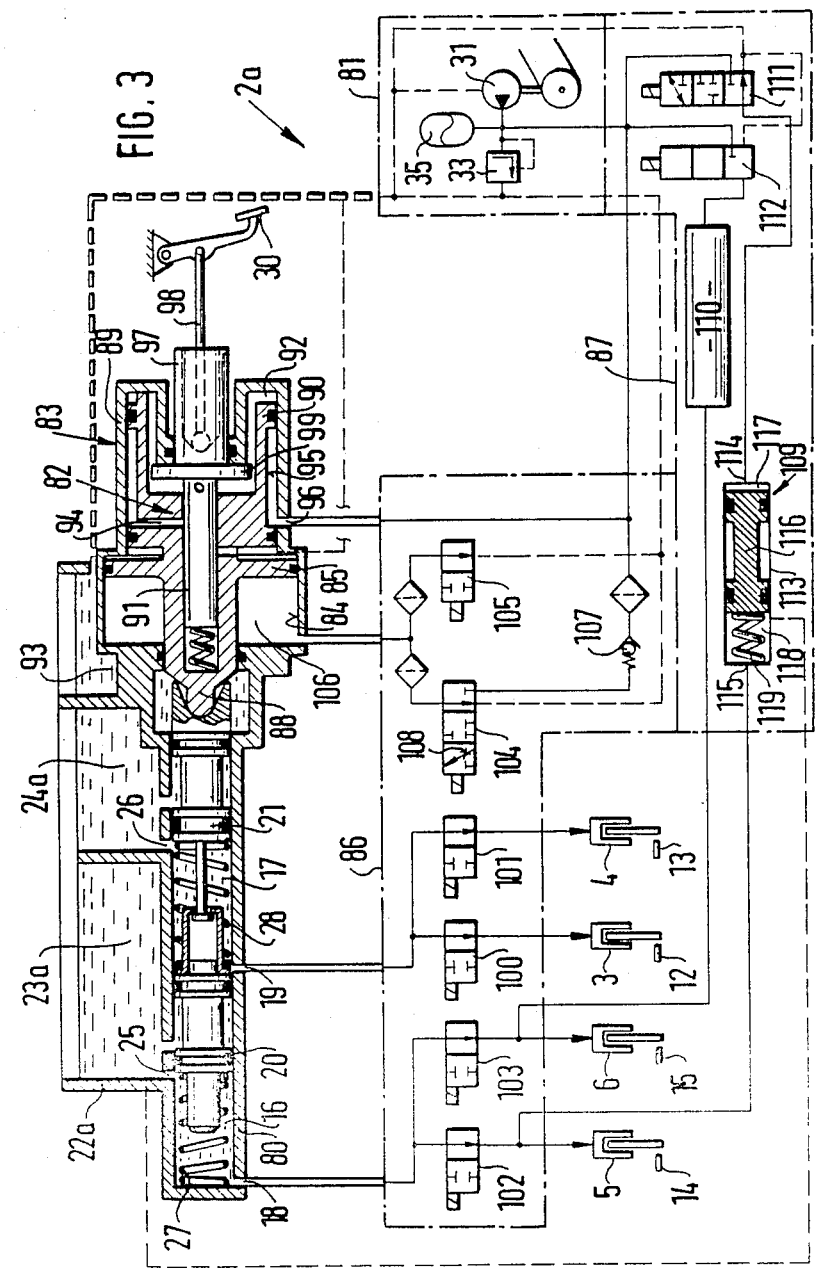

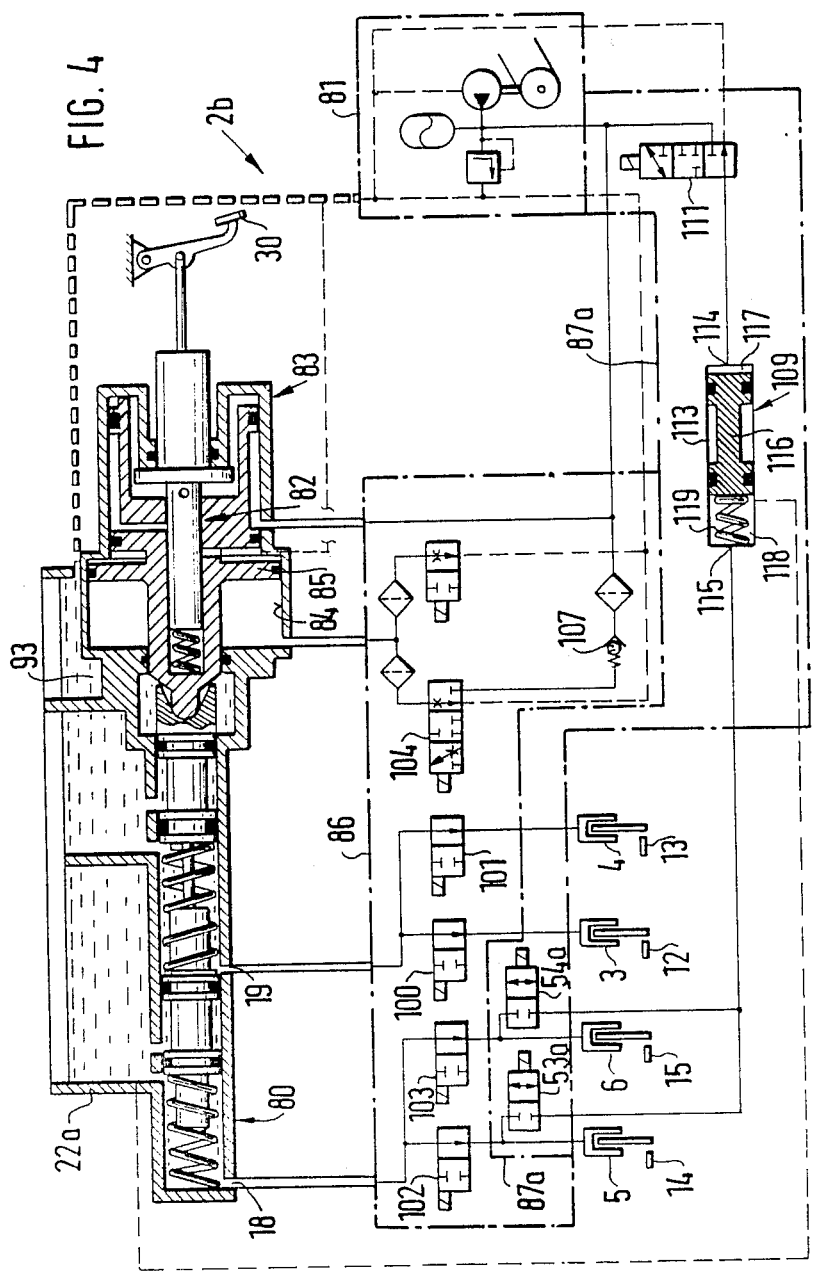

HYDRAULIC VEHICLE BRAKE SYSTEM

BACKGROUND OF THE INVENTION

The invention is based on a hydraulic vehicle brake system as defined hereinafter.

U. K. Patent 2,168,771 discloses a vehicle brake system with a brake booster supplied from an auxiliary pressure source; a master brake cylinder actuatable by the brake booster; wheel brakes; and an apparatus for preventing the danger of wheel locking and the attendant skidding during braking as well as for limiting drive slip. This apparatus has a first valve assembly with valves for blocking connections between the master brake cylinder and the wheel brakes, and a second valve assembly made up of a plurality of valves and used for controlling the brake booster in both the anti-skid and drive slip limitation situations. The design of the second valve assembly is disadvantageously complicated and expensive, so that installing a brake system of this type in otherwise relatively inexpensive vehicles makes them notably more expensive.

A vehicle brake system of this generic type, known from U.S. Pat. No. 4,589,706, dispenses with control of the brake booster by means of a complicated valve assembly during anti-skid operation and drive slip limitation. Second valves are therefore disposed between the first, blockable valves, which communicate with brake pressure connections of the master brake cylinder, and wheel brakes; these second valves are embodied as multi-position valves, which are complicated and expensive, and are capable of blocking connections between the first valves and the wheel brakes and of connecting the wheel brakes with a low-pressure supply container of the auxiliary pressure source. Further valves are connected to the brake booster and to the auxiliary pressure source, located between the first valves and the second valves and communicate with the second valves. In order to prevent the danger of skidding, these further valves serve to replace the quantities of pressure fluid that were diverted from wheel brakes to the low-pressure supply container of the auxiliary pressure source with such pressure fluid drawn from the brake booster, while to dissipate excessive drive torque they serve to introduce quantities of pressure fluid from the auxiliary pressure source into the wheel brakes of driven wheels exhibiting a tendency to spin. In this vehicle brake system as well, the overall engineering expense for the valves is disadvantageously high.

OBJECT AND SUMMARY OF THE INVENTION

The vehicle brake system revealed herein has the advantage over the prior art that the valve assembly for skid prevention is simpler, and that the valve assembly for limiting drive slip entails only little additional expense as compared with a vehicle brake system provided only with an anti-skid braking system. This makes the vehicle brake system according to the invention less expensive overall. This advantage pertains regardless of whether it is a valve assembly for controlling the brake booster, or a valve assembly by means of which quantities of pressure fluid are diverted from the wheel brakes and can be replaced for instance with quantities of pressure fluid from the brake booster, that is selected for skid prevention.

One advantageous feature of the invention is a vehicle brake system that is convenient to install and hence is more economical. In another feature of the invention, check valves are avoided, and the selection of the dimensions of the float piston assemblies makes it possible to limit the brake pressures intended for dissipating excessive drive torque, such that adverse heating of the wheel brakes of the driven wheels is avoided even over long, icy uphill roads. When the float piston assemblies are used, it is also possible to operate the auxiliary pressure source with a different pressure fluid from that of the master brake cylinder. By redesigning the valve assemblies, only one float piston assembly is required.

The invention will be better understood and further objects and advantages thereof will become more apparent from the ensuing detailed description of preferred embodiments taken in conjunction with the drawings.

BRIEF DESCRIPTION OF THE DRAWINGS

FIG. 3 shows a second exemplary embodiment of the vehicle brake system according to the invention; and FIG. 4 shows a third exemplary embodiment of the vehcile brake system according to the invention.

DESCRIPTION OF THE PREFERRED EMBODIMENTS

Figure 1:
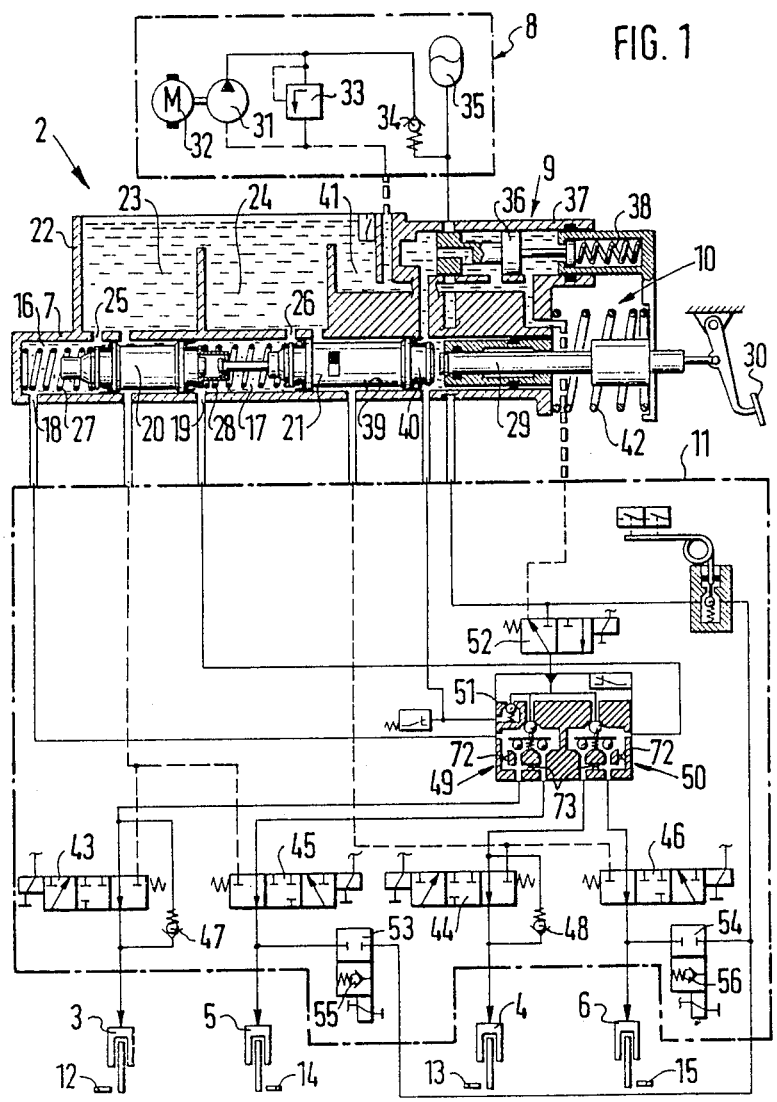
FIG. 1 shows a first exemplary embodiment of the hydraulic vehicle brake system according to the invention.

The vehicle brake system 2 of FIG. 1 has wheel brakes 3, 4 for undriven wheels; wheel brakes 5, 6 for driven wheels; a dual-circuit master brake cylinder 7; an auxiliary pressure source 8; a brake booster 10 equipped with a brake valve 9; and an apparatus 11 for preventing the danger of wheel locking, or skidding, and for limiting drive slip, or spinning, at driven wheels.

The wheel brakes 3-6 may be arbitrarily embodied as disk brakes or drum brakes (not shown). Disk brakes may be provided on the front wheels and drum brakes on the rear wheels. Wheel rotation sensors 12-15 are associated with the wheel brakes 3-6. These wheel rotation sensors may be found in the prior art and aimed for instance at markings located on the brake disks. These markings, not shown here, may for instance comprise teeth and gaps between them, depending on how the wheel rotation sensors are embodied, and the teeth may be integrally molded onto the brake disks or drums. The wheel rotation sensors 12-15 are connected to a control unit, not shown.

The master brake cylinder 7 has two cylinder chambers 16, 17 and master brake cylinder connections 18 and 19 associated with them, as well as a first master brake cylinder piston 29 and a second master brake cylinder piston 21 and a pressure fluid supply container 22 with two receptacles 23 and 24. With the master brake cylinder pistons 20 and 21 in the outset position, the receptacles 23 and 24 communicate via apertured bores 25 and 26, respectively, with the cylinder chambers 16 and 17, for the purpose of filling these cylinder chambers. Restoring springs 27 and 28 effect a displacement of the master brake cylinder pistons 20 and 21 into the aforementioned outset positions. In the extension of the longitudinal axis of the master brake cylinder 7, the master brake cylinder piston 21 is assigned an emergency brake tappet 29, which if the auxliary pressure source 8 fails is movable by means of a brake pedal 30 toward the master brake cylinder piston 21, to displace it toward the master brake cylinder piston 20. The displacement of the master brake cylinder piston 21 causes it to move past the aperture bore 26 associated with it, so that pressure fluid located in the cylinder chamber 17 is put under pressure and thus displaces the master brake cylinder piston 20, so that pressure fluid located in the cylinder chamber 16 likewise is put under pressure.

The brake pressure source includes a pump 31, a pump drive motor 32, a safety valve 33, a safety check valve 34, and a pressure reservoir 35.

The brake valve 9 has a brake valve slide 36, for example of the type found in the prior art, which is displaceable in a valve housing 37 by means of the brake pedal 30 via an interposed travel simulation spring 38. The valve housing 37 is connected to the auxiliary pressure source 8. The brake booster 10 includes a cylinder 30 and a booster piston 40, which is integrated with the master brake cylinder piston 21, for example, to make a single component. The cylinder 39 communicates hydraulically with the valve housing 37. The valve housing 37 further communicates with a low pressure supply container 41, which is accommodated in the form of a receptacle in the pressure fluid supply container 22 and from which the supply to the pressure source 8 is effected. Depending on the position of the brake valve slide 36, the cylinder 39 is either pressure-relieved toward this low pressure supply container 41, or communicates with the auxiliary pressure source 8 via the brake valve 9, in order to act upon the booster piston 40 to generate brake pressures in the cylinder chambers 16 and 17. A restoring spring 42 assures that the brake pedal, the brake valve slide 36 and the emergency brake tappet 29 return to their outset positions when the brake pedal 30 is released.

Figure 2:
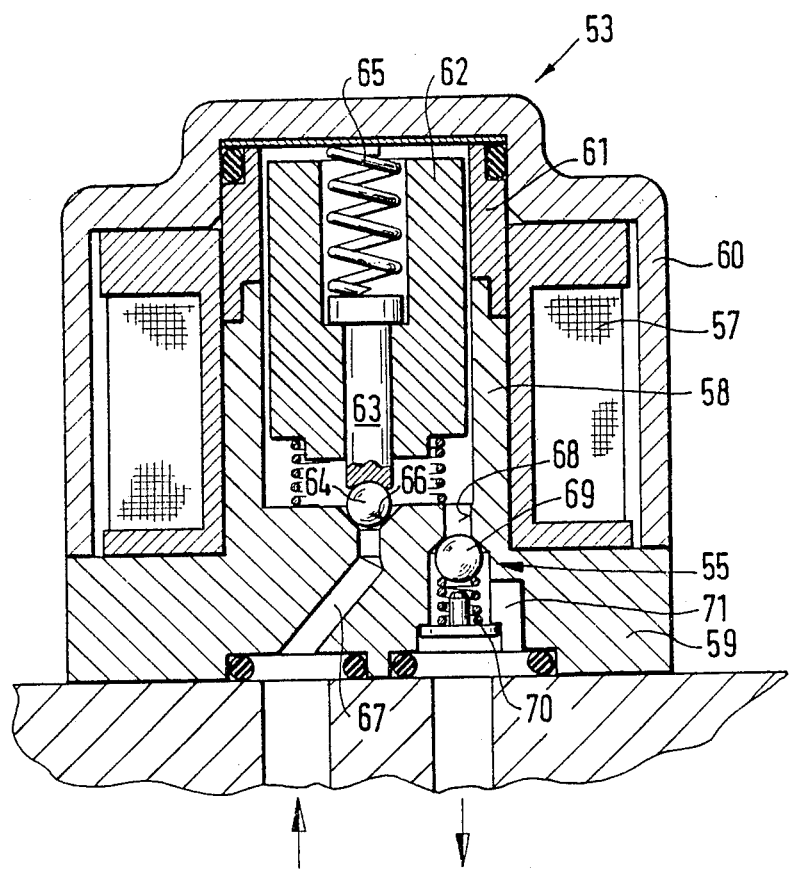
FIG. 2 shows a detail of the exemplary embodiment of FIG. 1.

The apparatus 11 is disposed between the wheel brakes 3–6 and the master brake cylinder and the brake booster 10. The apparatus 11 includes electromagnetically controllable 3/3-way valves 43, 44, 45, 46, respectively, which are individually associated with the wheel brakes 3–6; one-way valves 47 and 48, as fast pressure relief valves, individually associated with the wheel brakes 3 and 4; identically embodied gradient switchover valves 49 and 50 communicating with the wheel brake cylinder connections 18 and 19; a brake pressure feed valve 51 for anti-skid operation, connected to the cylinder 39; an electromagnetically actuatable pilot valve 52; and two valves 53 and 54 associated with the wheel brakes 5, 6 of the driven wheels to limit the drive slip. These last two valves communicate continuously with the wheel brakes 5 and 6 and are also connected to the auxiliary pressure source 8. The valves 53 and 54 are embodied as 2/2-way valves and have basic positions that are equivalent to blocking positions. The valves 53 and 54 are combined with one-way valves 55 and 56 in a series circuit and can be installed as a unit. This unit is shown in FIG. 2. The one-way valves 55, 56 decouple the wheel brakes 5, 6 in the event of drive slip limitation.

As shown in FIG. 2, one valve 53 includes an exciter coil 57, a pole tube 58 having an integrally molded on yoke element 59, a substantially cup-shaped second yoke element 60, a nonmagnetizable tube 61 between the pole tube 58 and the yoke element 60, an armature 62, a valve stem 63 having a valve head 64, a closing spring 65, and a valve seat 66, against which the valve head 64 is pressed by means of the closing spring 65 engaging the valve stem 63. The valve seat 66 is connectable via a conduit 67, which extends through the yoke element 59. The valve seat 66 opens when the valve head 64 is lifted into the pole tube 58. From there, a further conduit 68 leads to the one-way valve 55, which is built into the yoke element 59 and for example includes a valve ball 69 and a closing spring 70. The one-way valve 55 communicates via a conduit 71 with the associated wheel brake 5. The one-way valve 54 is embodied identically, and communicates in an equivalent manner, via its one-way valve 56, with the wheel brake 6.

In its basic position, the brake pressure gradient switchover valve 49 connects the master brake cylinder connection 18 in an unthrottled manner with the 3/3-way valves 43 and 45. The closing position of the brake pressure feed valve 51 is associated with this basic position. In the switching position, the brake pressure gradient switchover valve breaks the unthrottled connections, so that the brake cylinder connection 18 now communicates with the 3/3-way valves 43 and 45 via throttles 72 and 73. The opening position of the brake pressure feed valve 51 is associated with this switching position. In the switching positions of the two valves 49 and 51, the cylinder 39 and hence the brake valve 9 also communicate with the 3/3-way valves 43 and 45 via the throttles 72 and 73. The pilot valve 52 serves to switch over the valves 49, 50 and 51 into their switching positions. To this end, a switching piston, not shown but for instance found in U.S. Pat. No. 4,575,160, is provided. A detailed description of the brake pressure gradient switchover valve 50 is unnecessary, since it is embodied identically to the valve 49, and is also movable into its switching position simultaneously with this valve 49. It should merely be noted that this brake pressure gradient switchover valve 50 effects either throttled or unthrottled connections between the master brake cylinder connection 19, the brake valve 9, and the 3/3-way valves 44 and 46. Both brake pressure gradient switchover valves 49 and 50 are embodied for example as ball valves, in the manner of the valve described in U.S. Pat. No. 4,575,160. The energy for controlling the valves 49, 50 and 51 is supplied to the pilot valve 52 from the auxiliary pressure source 8.

The vehicle brake system 2 is shown in the idle position; that is, the brake pedal 30 is not actuated, and undesirably high drive slip could occur at driven wheels.

OPERATION

The vehicle brake system 2 functions as follows:

First, it is assumed that the pump drive motor 32 cannot be switched on, for whatever reason, and accordingly the pressure reservoir 35 contains no usable energy. Then, if the brake pedal 30 is actuated, the booster piston 40 and the master brake cylinder piston 21 connected to it are displaced solely by the muscle power of the driver, via the emergency brake tappet 27, in order to generate brake pressure. As already indicated, the brake pressures are produced in the cylinder chambers 16 and 17, and from their master brake cylinder connections 18 and 19 the brake pressures flow through the brake pressure gradient switchover valves 49 and 50 to reach the 3/3-way valves 43, 44, 45 and 46 and through these 3/3-way valves into the respective wheel brake 3, 4, 5 or 6. Since braking is being done only with foot power, there is no danger of skidding at the wheels connected to the wheel brakes 3, 4, 5 and 6 as long as the road surface affords a relatively good grip. If the brake pedal is released rapidly, the brake pressure fluid contained in the wheel brakes 3 and 4 is capable of for the most part escaping through the one-way valves 47 and 48 to the master brake cylinder 7, so that an unavoidable throttling action of the 3/3-way valves 43 and 44 is not a hindrance when the wheel brakes 3 and 4 are released.

If the vehicle brake system 2 is functioning correctly, the pump drive motor 32 drives the pump 31, which supplies the pressure reservoir 35 with adequate pressure. If a vehicle having a full pressure reservoir 35 is in motion, then in accordance with the rotating wheels of the vehicle, wheel rotation signals will be emitted by the wheel rotation sensors 12–15; these signals are monitored by the control unit, mentioned above but not shown in the drawings. If the vehicle is being driven on a surface with little adhesion and is braked by the actuation of the brake pedal, the depression of the brake pedal 30 effects a displacement of the brake valve slide 36, via the travel simulator spring 38. As a result, the brake valve slide 36 disconnects the cylinder 39 from the low pressure supply container 41 and connects the cylinder 39 with the auxiliary pressure source 8 until such time as a pressure, rising as a result opposite the travel simulator spring 38, urges the brake valve slide 36 counter to the travel simulator spring 38, compressing it. However, since the compression of the travel simulator spring 38 requires the driver to resist at the brake pedal 30, the pressure that becomes operative in the cylinder 39 at the booster piston 40 is dependent on the position of the brake pedal 30.

The pressure acting upon the booster piston 40 displaces it and the master brake cylinder piston 21, so that in the manner already described, brake pressures are generated in the brake cylinders 16 and 17 and reach the wheel brakes 3, 4, 5 and 6.

If an increasingly forceful actuation of the brake pedal generates a braking force, for instance at the wheel brake 3, that threatens to cause skidding of the associated wheel, this wheel will decrease in rotational speed faster than the other wheels that are not threatening to skid. Accordingly, wheel rotation angle signals emitted by the associated wheel rotation signal 12 will reach the control unit at increasingly longer time intervals, and by comparison with wheel rotation signals of the other wheel rotation sensors 13, 14 and 15, the control unit recognizes the threat of skidding. When the threat of skidding is recognized, the control unit directs the 3/3-way valve 43 into its secondary control position, the so-called brake pressure reduction position. In this position, the 3/3-way valve 43 connects the wheel brake, via lines not shown, with the the pressure fluid supply container 22, so that the braking force drops, and the rotation of the wheel is accelerated, by contact with the road surface. Once a sufficient wheel rotation acceleration has taken place, wheel rotation pulses from the wheel rotation sensor reach the control unit at shorter and shorter intervals, and from this the control unit recognizes that the threat of skidding is past. As a result, the control unit directs the 3/3-way valve 43 back into its basic position, so that a connection with the brake pressure gradient switchover valve 49 is re-established. Now, to prevent a partial evacuation of the cylinder chamber 16 due to a pressure drop between it and the wheel brake 3 because of the re-establishment of the connection, the control unit switches the brake pressure feed valve 51, via the pilot valve 52, into its feeding position, and in so doing simultaneously opens the brake pressure gradient switchover valve 49 to the brake pressure feed valve 51. As a result, pressure fluid is supplied from the brake valve 9 to the wheel brake 3, over the detour via the cylinder 39 and the 3/3-way valve 43. The switchover of the brake pressure gradient switchover valve, as already explained, means that the throttle 72 is now located in the connection with the wheel brake 3. The throttle 72 effects a gradual increase in brake pressure in the wheel brake 3, so as to prevent as immediate overbraking of the associated wheel. Once the brake pressure has increased gradually, as intended, a further threat of skidding may arise, and the control unit recognizes it and can prevent an adverse further increase in pressure for instance by directing the 3/3-way valve 43 into its first switching position, in which this valve 43 prevents a further flow of pressure fluid to the wheel brake 3 and hence prevents a further increase in pressure.

The 3/3-way valves 44, 45 and 46 are actuated in the same manner, whenever the wheel brakes 4, 5 and 6 associated with them cause a threat of skidding. If no further danger of skidding arises within a pre-selectable period of time, then the control unit allows the pilot valve 52 to return to its outset position, and as a result the valves 49, 50 and 51 resume their basic positions as well. After that, the brake pressure gradient switchover valves 49 and 50 cause no further throttling, and the next time braking is done, it is once again controllable by means of the brake pedal.

If the vehicle is driven, a variable extent of drive slip arises at the driven wheels, with which the wheel brakes 5 and 6 are associated. This drive slip makes the wheels less able to exert lateral guide forces upon the vehicle. For this reason, the magnitude of the drive slip should be limited such that adequate lateral guidance force is available to the vehicle; otherwise, the vehicle cannot be driven safely around a curve, for example, nor can it be prevented from sliding on banked road surfaces. Once again, the control unit monitors rotational angle indications from the wheel rotation sensors 12–15 and detects whether driven wheels are attaining a critical drive slip magnitude. If drive slip of an undesirable magnitude arises at the wheel associated with the wheel brake 5, for example, the control unit directs the valve 53 out of its basic position into the open position and simultaneously directs the 3/3-way valve 45 into its first control position, in which this valve breaks a connection between the wheel brake 5 and the master brake cylinder 7. The result is that pressure fluid flows from the auxiliary pressure source 8 through the opened valve 53 to the wheel brake 5, where it generates a brake pressure that dissipates excessive drive torque. The wheel brake 5 consequently decelerates the driven wheel with which it is associated. The magnitude of the deceleration is detected by the control unit via the wheel rotation sensor 14. Once sufficient deceleration has taken place, the control unit directs the valve 53 back into its basic position, so that no further increase of brake pressure in the wheel brake 5 is possible. If the decrease in the drive torque acting upon the wheel now lowers the magnitude of the drive slip to below a preselected threshold, the control unit causes the 3/3-way valve 45 to return to its basic position, causing pressure fluid to escape from the wheel brake 5 through the 3/3-way valve 45, the brake pressure gradient switchover valve 49, the cylinder chamber 16 and the aperture 25 to the pressure fluid supply container 22. The procedure described above is typical, for instance whenever a wheel encounters a wet or icy patch on a roadway.

If undesirable drive slip arises at both driven wheels, then logically both 3/3-way valves 45 and 46 are directed into blocking positions, and both valves 53 and 54 are opened.

The valves 45, 46 and 53, 54 can also be used as a temporary replacement for a hand-actuated parking brake, for instance during a brief stop of the vehicle on a hill.

By providing two valves 53 and 54 for one axle, the brake system functions similarly to a differential lock. The brake system may logically be equipped with further valves, if further valves in addition to the two driven wheels described are to be driven, and these further wheels are driven via at least one differential gear.

The exemplary embodiment of a vehicle brake system 2a according to FIG. 3 again has wheel brakes 3, 4, 5 and 6, of which the wheel brakes 5 and 6 are associated with driven vehicle wheels; wheel rotation sensors 12–14 associated with the wheel brakes 3–6; a master brake cylinder 80; an auxiliary pressure source 81; a brake valve 82; a brake booster 83; an auxiliary cylinder 84 and an auxiliary piston 85, which are part of an apparatus 86 for preventing the danger of skidding; and an apparatus 87 for limiting drive slip.

Analogously to the first exemplary embodiment, the master brake cylinder 80 has cylinder chambers 16, 17, master brake cylinder connections 18, 19, master cylinder pistons 20, 21, a pressure fluid supply container 22a having receptacles 23a, 24a, apertures 25, 26, and restoring springs 27, 28.

The auxiliary cylinder 84 follows, in the direction toward the brake booster 83 and in coaxial alignment with the master brake cylinder 80. The auxiliary cylinder 84 receives the auxiliary piston 85 in a longitudinally displaceable manner. The auxiliary piston 85 has a tappet-like extension 88, which is aimed at the master brake cylinder piston 21. The brake booster 83 has a booster cylinder 89, which is aligned coaxially with the auxiliary cylinder 84, and a booster piston 90, which adjoins the auxiliary piston 85. The brake valve 82 is integrated with the auxiliary piston 85 and the booster piston 90, so that these pistons 85 and 90 form a brake valve housing. A brake valve slide 91 is displaceable in this housing; by means of this slide, in its basic position, a booster chamber 92 defined by the booster cylinder 89 and the booster piston 90 communicates with a low pressure supply container 93, for example via lines or conduits, not shown. By a relative displacement of the brake valve slide 91 in the pistons 85 and 90, the booster chamber 92 can also be made to communicate with the auxiliary pressure source 81. To this end, the booster piston 90 has an inflow bore 94, which discharges into a circumferential groove 95 located on the booster piston 90. A supply connection 96 aligned with the circumferential groove 95 is provided on the booster cylinder 89 and via lines and conduits, not shown, is supplied with pressure fluid under pressure from the auxiliary pressure source 81. The brake valve slide 91 is displaced by means of a brake pedal 30 via a sensor piston 97, which is sealed off relative to the booster cylinder 89, and via a pedal rod 98. A circularly bounded pressure plate 99 is connected with the sensor piston 97 inside the booster chamber 92. The sensor piston 97 and the pressure plate 99 together form an emergency brake tappet, which can be pressed by the brake pedal 30 against the booster piston 90, so that the master brake cylinder piston 21 is displaceable via the booster piston and the tappet-like extension 88, in order to generate emergency brake pressure. The master brake cylinder piston 21 and the master brake cylinder piston 20 indirectly displaced by it have already been described in conjunction with the first exemplary embodiment shown in FIG. 1.

Once again, the auxiliary pressure source 81 has a pump 31, a safety valve 33 and a pressure reservoir 35. Unlike the embodiment of FIG. 1, the pump 31 here is driven by a vehicle drive motor, not shown, for instance via a belt. Also unlike the embodiment of FIG. 1, the pressure fluid drawn by the pump from the low pressure supply container 93 and delivered to the pressure reservoir 35 may be a different pressure fluid from that maintained in reserve in the pressure fluid supply container 22a for supplying the master brake cylinder. The pressure fluid pumped by the pump 31 may for instance by a hydraulic oil used in a power steering unit of the driving engine.

The apparatus 86 for preventing the danger of skidding includes magnetically controllable valves 100–103, which are inserted between the wheel brakes 3, 4, 5, 6 and the associated master brake cylinder connections 18 and 19, and two control valves 104 and 105 for controlling the action upon the auxiliary piston 85, using the auxiliary pressure source 81. The valves 100–103 are embodied simply as 2/2-way valves and are controllable by a control unit, not shown, which again is connected to the wheel rotation sensors 12–15. The control valve 104 is preferably embodied as a 3/3-way valve and is likewise controllable by the control unit. In its basic position, the control valve 104 connects a counteraction chamber 106, defined in the auxiliary cylinder 84 between the auxiliary piston 85 and the master brake cylinder 80, with the low pressure supply container 93, via lines or the like, not shown. In a first switching position, the valve 104 blocks off all its connections from one another. In a second switching position, the control valve 104 connects the pressure reservoir 35 with the counteraction chamber 106, via lines or the like, not shown, and via a check valve 107 incorporated into these lines for the sake of safety. To limit a displacement speed of the auxiliary piston 85 if it is acted upon by pressure fluid from the auxiliary pressure source 81, a throttle 108 is associated with the second control position of the control valve 104. The control valve 105 is likewise controllable electromagnetically from the control unit. In its basic position, the control valve 105 is open and connects the counteraction chamber 106 with the low pressure supply container 93 via a second route through suitable lines. In the switching position, the control valve 105 breaks this connection. The control valve 105 has a flow cross section that acts as a throttle.

The apparatus 87 for limiting drive slip includes two float piston assemblies 109, 110 and two electromagnetically controllable valves 111 and 112, and it jointly uses the valves 102 and 103 of the apparatus 86 intended for limiting the danger of skidding. The valves 112 and 111 are connected to the pressure reservoir 35 and are advantageously embodied as 3/3-way valves. The valves 111 and 112 also communicate, via return lines or the line, not shown, with the low pressure supply container 93 and are embodied such that in their basic positions they relieve the flow piston assemblies 109 and 110 toward the low pressure supply container 93. Each of the flow piston assemblies 109, 110 has a cylinder 113 with a connection 114 to the applicable valve 111 or 112 and a further connection 115, which is connected to the applicable wheel brake 5 or 6 via lines, not shown. One flow piston 116 is sealingly displaceable in each cylinder 113. The float piston divides the cylinder 113 into a primary chamber 117 and a secondary chamber 118. The primary chamber 117 is located next to the connection 114, and the secondary chamber is located next to the connection 115. A restoring spring 119 is built into the secondary chamber 118, urging the associated float piston 116 toward the connection 114, so that as long as there are no major pressure differences between the connections 114 and 115, the volumetric content of the secondary chamber 118 is the larger, and that of the primary chamber 117 is the smaller.

OPERATION

The second exemplary embodiment of the vehicle brake system 2a shown in FIG. 3 functions as follows:

First, it is again assumed that the auxiliary pressure source 81 is not furnishing auxiliary pressure. If the vehicle has to be braked, then the booster piston is displaced toward the cylinder chamber 16, along with the auxiliary piston 85 and the extension 88, by means of the brake pedal via the pedal rod 98, the sensor piston 97 and the pressure plate 99. The master brake cylinder piston 21 is first moved past the aperture 26, so that a pressure arises in the cylinder chamber 17 that not only becomes operative in the wheel brakes 3 and 4, through the master brake cylinder connection 19 and the valves 100 and 101, which are in their open position, but also displaces the master brake cylinder piston 21 past its aperture 25, thus generating pressure in the cylinder chamber 16, which becomes operative as brake pressure in the wheel brakes 5 and 6, through the master brake cylinder connection 18 and the valves 102 and 103, which are in their open positions. When the brake pedal 30 is released, the aforementioned pistons 90, 85, 21 and 20 return to their outset positions, and accordingly no further braking occurs.

If the brake pedal 30 is moved when the auxiliary pressure source 81 is functioning properly, then the pedal rod 98 displaces the valve slide 91 relative to the pistons 85 and 90, via the sensor piston. As a result, as already noted, the booster chamber 92 is disconnected from the low pressure supply container 93 and is connected to the auxiliary pressure source 81. As a result, pressure fluid flows into the booster chamber 92 and displaces the booster piston 90 toward the cylinder chamber 16 of the master brake cylinder 80, as a result of which brake pressures can be generated in the same manner as with actuation purely with the pressure plate 99. The resultant boosting pressure prevailing in the booster chamber 92 acts in the opposite direction upon the sensor piston 97 and can finally be felt at the brake pedal via the pedal rod 98. The boosting pressure is therefore proportional to the force with which the driver presses on the brake pedal 30.

If the brake pedal 30 is actuated too forcefully, triggering the danger of skidding at the wheel brake 5, for instance, the control unit will again assure that this danger of skidding will vanish. To this end, the control unit directs the valve 105 into its closing position and the control valve 104 into its secondary control position, so that by means of pressure from the auxiliary pressure source 81, a pressure is produced in the counteraction chamber 106 that via the auxiliary piston 85 overcomes the boosting force generated by the booster piston 90 and moves the booster piston 90 in the direction of its outset position. The pressures in the cylinder chambers 16 and 17 accordingly drop, causing the brake pressure in the wheel brake 5 to drop as well. To avoid reducing the brake pressures in the wheel brakes 3, 4 and 6 unnecessarily as well, which would unnecessarily lengthen the braking distances, the valves 100, 101 and 103 are closed at the instant of counteraction on the auxiliary piston 85. Brake pressure reductions therefore become operative only in the wheel brake 5. By returning the control valve 104 into its first switching position, an unnecessary brake pressure reduction in the cylinder chamber 16 can be avoided. Once the danger of skidding is past, the control unit directs the two control valves 104 and 105 back into their basic positions, and also opens the valves 100, 101 and 103. As a result, because of the now re-established connection between the counteraction chamber 106 and the low pressure supply container 93, the auxiliary piston 85 escapes the boosting pressure, and the master brake cylinder pistons 21 and 20 re-establish the original brake pressure.

If drive moments that would lead to undesirably high drive slip are transmitted to both driven wheels by a driving engine, not shown, then the valves 102 and 103 are closed by the control unit, and the valves 111 and 112 are directed into their secondary positions, in which they introduce pressure medium from the pressure reservoir 35 into the primary chambers 117 of the float piston assemblies 109 and 110. These pressures displace the float pistons 116, so that the volumes of the secondary chambers 118 decrease, and pressures are produced there that become operative in the wheel brakes 5 and 6, because of the closure of the valves 102 and 103. For the sake of simplicity, the simultaneous occurrence of slip of identical magnitude at both driven wheels has been used to explain the mode of operation. This can certainly happen, for instance if an engine produces excessive drive torque on a straight road, and this torque is transmitted via a blocked differential gear to the driven wheels. If no such differential gear is present, then naturally only one wheel may be braked instead, analogously to the exemplary embodiment of FIG. 1, and depending on prevailing conditions. Naturally the apparatus 87 for limiting drive slip as described above can also be modified further so as to limit slip of additional driven wheels.

The third exemplary embodiment of a vehicle brake system 2b, as shown in FIG. 4, differs from the vehicle brake system 2a of FIG. 3 only in having a differently embodied apparatus 87a for limiting drive slip. This apparatus 87a has only one valve 111 and one float piston assembly 109. The float piston assembly 109 serves simultaneously both to generate brake pressures in the wheel brakes 5 and 6 and to generate brake pressure in one of the two wheel brakes 5 or 6. To this end, the float piston assembly 109 can be connected via respective valves 53a and 54a to the wheel brakes 5 and 6. The valves 53a and 54a differ from the valves 53 and 54 of the first exemplary embodiment only in that they have no one-way valves 55 (FIG. 1) associated with them. The provision of such valves 55 is unnecessary, because whenever the float piston 116 is in its terminal position at the connection 114, the float piston assembly 109 does not permit pressure fluid to escape from the wheel brakes 5 and 6 into the low pressure supply container 93. The advantage that a float piston assembly 109 replaces a check valve, which is otherwise conventionally provided for safety reasons, is naturally present in the exemplary embodiment of FIG. 3 as well. It will be readily understood that the valves 53a and 54a, in combination with the float piston 116 controlled by the valve 111, are controllable by the same basic control principle as the valves 100–103 in combination with a counteraction on the auxiliary piston 85. From this, it is apparent that only one valve 111 and one float piston assembly 109 are sufficient for adapting brake pressures in the wheel brakes 5 and 6 to given requirements independently from one another and successively as needed. This is done analogously to the mode of operation of the first exemplary embodiment shown in FIG. 1.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic brake system for vehicles having wheels with wheel brakes, comprising a master brake cylinder, a brake booster which boosts fluid pressure in said master brake cylinder, an auxiliary pressure source combined with said brake booster for actuating said brake booster for application of brake pressure to the brakes via said master brake cylinder and fluid flow blockable valve assemblies disposed in a brake fluid pressure line between said master brake cylinder and said wheel brakes, and for controlling wheel drive slip via control valves connected to a fluid pressure line between at least one of said blockable valve assemblies and said brakes for a driven wheel, signal control means for controlling said blockable valve assemblies for preventing skidding of a wheel and for controlling said blockable valves and said control valves for limiting drive slip at driven wheels, said control valves being operative for limiting drive slip by means of pressure from said auxiliary pressure source, said control valves permit brake pressures to be introduced into wheel brakes (5, 6) of the driven wheels for limiting drive slip, with the aid of pressure from said auxiliary pressure source (8, 81).

2. A vehicle brake system as defined by claim 1, in which the control valves (53, 54) for introducing brake pressures to the brakes of the driven wheels are embodied as 2/2-way valves and are combined into units with one-way valves (55, 56) that seal off the wheel brakes (5, 6) of the driven wheels in the direction toward the auxiliary pressure source (8).

3. A vehicle brake system as defined by claim 1, in which the control valves (111, 112) for introducing brake pressures to the brakes of the driven wheels communicate with the wheel brakes (5, 6) via spring loaded float piston assemblies (109, 110, 116) and are embodied such that in their basic positions they connect the float piston assemblies (109, 110) in a pressure-relieving manner with a low pressure supply container (93).

4. A vehicle brake system as defined by claim 1, in which the control valves (53a, 54a) that introduce brake pressure into the wheel brakes (5, 6) of the driven wheels are embodied as 2/2-way valves and are connected in common to a float piston assembly (109), which in turn can be pressure relieved via a valve (111) and during braking is connected to the auxiliary pressure source (81).

* * * * *